(12) United States Patent
Wey et al.

(10) Patent No.: US 10,425,690 B2
(45) Date of Patent: Sep. 24, 2019

(54) VIDEO PROCESSING DEVICE AND METHOD

(71) Applicant: SAMSUNG ELECTRONICS CO., LTD., Suwon-si (KR)

(72) Inventors: Ho-cheon Wey, Seongnam-si (KR); Joon-hyun Lee, Seoul (KR); Chan-yul Kim, Bucheon-si (KR); Jeong-hoon Park, Seoul (KR); Sun-il Lee, Seoul (KR); Kwang-pyo Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/306,902

(22) PCT Filed: May 1, 2015

(86) PCT No.: PCT/KR2015/004455
§ 371 (c)(1),
(2) Date: Oct. 26, 2016

(87) PCT Pub. No.: WO2015/167311
PCT Pub. Date: Nov. 5, 2015

(65) Prior Publication Data
US 2017/0048583 A1 Feb. 16, 2017

(30) Foreign Application Priority Data
May 2, 2014 (KR) .................. 10-2014-0053627

(51) Int. Cl.
*H04N 21/266* (2011.01)
*H04N 21/45* (2011.01)
(Continued)

(52) U.S. Cl.
CPC ....... *H04N 21/4627* (2013.01); *H04N 21/435* (2013.01); *H04N 21/4408* (2013.01);
(Continued)

(58) Field of Classification Search
CPC ......... H04N 21/26606; H04N 21/4532; H04N 21/45455
(Continued)

(56) References Cited

U.S. PATENT DOCUMENTS

| 6,553,566 B1 * | 4/2003 | Grant | .................. | H04N 7/0806 |
| | | | | 348/465 |
| 8,190,896 B2 | 5/2012 | Ryu | | |

(Continued)

FOREIGN PATENT DOCUMENTS

| CN | 1385028 A | 12/2002 |
| CN | 101790735 A | 7/2010 |

(Continued)

OTHER PUBLICATIONS

Communication dated Jul. 9, 2015, issued by the International Searching Authority in counterpart International Application No. PCT/KR2015/004455 (PCT/ISA/220, 210, 237).

(Continued)

*Primary Examiner* — Dominic D Saltarelli
(74) *Attorney, Agent, or Firm* — Sughrue Mion, PLLC

(57) ABSTRACT

Provided is a video processing device and method capable of enhancing security of content included in a video, the video processing device including: a loader configured to load an original video; an encoder configured to generate an encoded video including a header and a payload by encoding the loaded original video; and a security information inserter configured to insert security information comprising information about a reproduction right of the video into the header or the payload.

15 Claims, 4 Drawing Sheets

(51) Int. Cl.
*H04N 21/4545* (2011.01)
*H04N 21/4627* (2011.01)
*H04N 21/6334* (2011.01)
*H04N 21/83* (2011.01)
*H04N 21/435* (2011.01)
*H04N 21/4408* (2011.01)
*H04N 21/84* (2011.01)

(52) U.S. Cl.
CPC ......... *H04N 21/6334* (2013.01); *H04N 21/83* (2013.01); *H04N 21/84* (2013.01)

(58) Field of Classification Search
USPC ...................................................... 725/25–31
See application file for complete search history.

(56) References Cited

U.S. PATENT DOCUMENTS

| | | |
|---|---|---|
| 8,266,715 B2 | 9/2012 | Lee |
| 8,474,054 B2 | 6/2013 | Vantalon et al. |
| 2003/0023564 A1 | 1/2003 | Padhye et al. |
| 2005/0086069 A1* | 4/2005 | Watson ............. H04N 21/4508 726/3 |
| 2005/0212968 A1* | 9/2005 | Ryal ........................ H04N 5/04 348/565 |
| 2008/0037825 A1* | 2/2008 | Lofgren ............ G06F 17/30241 382/100 |
| 2008/0222676 A1* | 9/2008 | Yun ..................... H04H 20/426 725/38 |
| 2009/0119781 A1 | 5/2009 | Sugano et al. |
| 2012/0075420 A1 | 3/2012 | Cho et al. |
| 2012/0163653 A1 | 6/2012 | Anan et al. |
| 2013/0170645 A1 | 7/2013 | Chang |
| 2013/0170693 A1 | 7/2013 | Marsh et al. |

FOREIGN PATENT DOCUMENTS

| | | |
|---|---|---|
| EP | 1223742 A1 | 7/2002 |
| EP | 2219128 A2 | 8/2010 |
| JP | 1066052 A | 3/1998 |
| KR | 1020060056017 A | 5/2006 |
| KR | 1020070076130 A | 7/2007 |
| KR | 1020070113758 A | 11/2007 |
| KR | 1020120032249 A | 4/2012 |

OTHER PUBLICATIONS

Communication dated Dec. 26, 2016 issued by Korean Intellectual Property Office in counterpart Korean Application No. 10-2016-0054273.
Communication dated Feb. 2, 2017 issued by Korean Intellectual Property Office in counterpart Korean Application No. 10-2016-0054273.
Communication dated Oct. 24, 2017 , from the European Patent Office in counterpart European Application No. 15785441.5.
Communication dated Jan. 2, 2019, from the State Intellectual Property Office of People's Republic of China in counterpart Application No. 201580032250.6.
Communication dated Feb. 25, 2019 from the Korean Intellectual Property Office in counterpart KR application No. 10-2016-54273.
Communication dated Feb. 19, 2019, issued by the Intellectual Property India in counterpart Indian Patent Application No. 201627036480.
Communication dated Jun. 19, 2019, issued by the Chinese Patent Office in counterpart Chinese Application No. 201580032250.6.

* cited by examiner

VIDEO PROCESSING DEVICE AND METHOD

This application is a National stage entry of International Application No. PCT/KR2015/004455, filed on May 1, 2015, which claims priority from Korean Patent Application No. 10-2014-0053627, filed on May 2, 2014 in the Korean Intellectual Property Office. The disclosures of each of the applications are herein incorporated by reference in their entirety.

TECHNICAL FIELD

The present disclosure relates to a video processing device and method capable of enhancing security of content included in a video.

BACKGROUND ART

Video capturing apparatuses, such as cameras or camcorders, are widely supplied not only to expert consumers but also to general consumers. Recently, according to development of digital technology, digital video capturing apparatuses have been supplied. Specifically, the digital video capturing apparatuses are supplied by being included in portable terminals, such as smart phones or tablet personal computers (PCs).

Also, according to wide supply of the Internet and development of Internet services, an environment in which videos are easily shared is being built. Technology for protecting digital copyright is being developed to restrict indiscreet sharing when content included in a video has copyright.

Specifically, regarding a video to which digital rights management (DRM) technology is applied, a license of content included in the video may be managed. Such a video is reproduced after the license is checked, and thus only a person having a just right is able to consume the content.

However, when the video is shared after the DRM technology applied to the video is removed by a cracker or a hacker, copyright of the content included in the video may be infringed.

DETAILED DESCRIPTION OF THE INVENTION

Technical Problem

The present disclosure provides a video processing device and method capable of enhancing security of content included in a video.

Technical Solution

According to an aspect of the present disclosure, there is provided a video processing device and method capable of restricting reproducing of at least a portion of content included in a video according to a level of right set to a video reproducing device reproducing the video.

Advantageous Effects

According to one or more embodiments, security of content included in a video may be enhanced.

Also, reproducing of at least a portion of content included in a video may be restricted according to a level of right set to a video reproducing device reproducing the video.

BEST MODE

Figure 1:
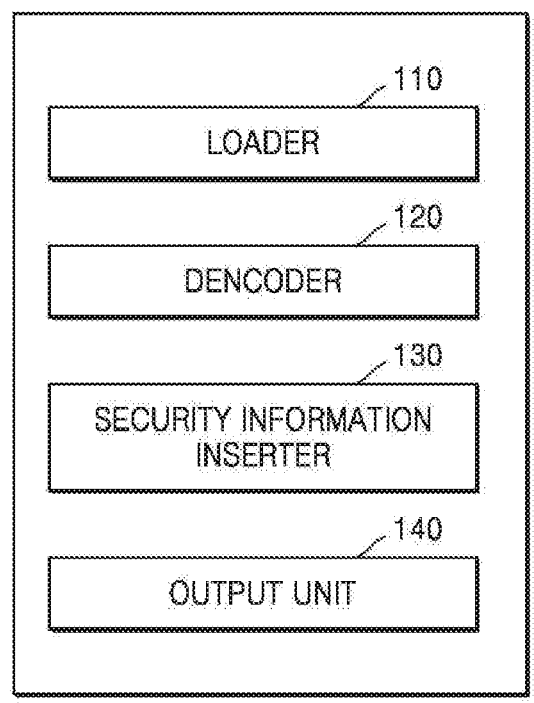
FIG. 1 is a block diagram of a structure of a video processing device generating a secured video, according to an embodiment.

According to one or more embodiments, a video processing device includes: a loader configured to load an original video; an encoder configured to generate an encoded video including a header and a payload by encoding the loaded original video; and a security information inserter configured to insert security information including information about a reproduction right of the video into the header or the payload.

The security information may include an identifier of a video reproducing device having a right to reproduce the video.

The security information may further include information about content allowed to be reproduced by the video reproducing device or information about content restricted from being reproduced by the video reproducing device, from among content included in the video.

The security information inserter may further insert digital rights management (DRM) information into the video into which the security information is inserted. The video processing device may further include an output unit configured to transmit the video into which the security information is inserted, to an external destination.

According to one or more embodiments, a video processing device includes: a loader configured to load an original video; a security information inserter configured to overwrite security information including information about a reproduction right of the video on pixel data corresponding to some of pixels included in the original video; and an encoder configured to encode the original video on which the security information is overwritten.

According to one or more embodiments, a video processing device includes: a video loader configured to load a secured video generated as security information including information about a reproduction right of an encoded video including a header and a payload is inserted into the header or the payload of the encoded video; a right checker configured to detect information about content allowed to be or restricted from being reproduced from among content included in the secured video, by using the security information; and a decoder configured to decode the secured video by using the detected information.

The decoder may perform scrambling on the content restricted from being reproduced from among the content included in the secured video.

A certain screen included in the secured video may include the content allowed to be reproduced and the content restricted from being reproduced together, and the decoder may perform scrambling only on a portion in the certain screen where the content restricted from being reproduced is located.

The decoder may insert a watermark into the content restricted from being reproduced from among the content included in the secured video.

The secured video may further include digital rights management (DRM) information, and the right checker may access the security information by using a license corresponding to the DRM information.

The video processing device may further include a reproducer configured to reproduce the decoded video.

According to one or more embodiments, a video processing method includes: loading an original video; generating an encoded video including a header and a payload by encoding the loaded original video; and inserting security information including information about a reproduction right of the video into the header or the payload.

The security information may include an identifier of a video reproducing device having a right to reproduce the video.

The security information may further include information about content allowed to be reproduced by the video reproducing device or information about content restricted from being reproduced by the video reproducing device, from among content included in the video.

The video processing method may further include, after the inserting of the security information into the header or the payload, inserting digital rights management (DRM) information into the video into which the security information is inserted.

According to one or more embodiments, a video processing method includes: loading a secured video generated as security information including information about a reproduction right of an encoded video including a header and a payload is inserted into the header or the payload of the encoded video; detecting information about content allowed to be or restricted from being reproduced from among content included in the secured video, by using the security information; and decoding the secured video by using the detected information.

The video processing method may further include, after the decoding of the secured video by using the detected information, scrambling the content restricted from being reproduced from among the content included in the decoded video.

A certain screen included in the decoded video may include the content allowed to be reproduced and the content restricted from being reproduced together, and the scrambling of the content restricted from being reproduced may include scrambling only a portion in the certain screen where the content restricted from being reproduced is located.

The secured video may further include digital rights management (DRM) information, and the detecting of the information about content allowed to be or restricted from being reproduced from among the content included in the secured video may include: accessing the security information by using a license corresponding to the DRM information; and detecting the information about content allowed to be or restricted from being reproduced by using the accessed security information.

MODE OF THE INVENTION

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present invention will only be defined by the appended claims. Like reference numerals refer to like elements throughout the specification.

While such terms as "first", "second", etc., may be used to describe various components, such components must not be limited to the above terms. The above terms are used only to distinguish one component from another. Accordingly, a first element mentioned hereinafter may refer to a second element within the technical aspect of the present invention.

The terms used in the present specification are merely used to describe particular embodiments, and are not intended to limit the present invention. An expression used in the singular encompasses the expression in the plural, unless it has a clearly different meaning in the context. In the present specification, it is to be understood that the term such as "comprises" or "comprising" are not intended to preclude the possibility that one or more other features, numbers, steps, actions, components, parts, or combinations thereof may exist or may be added.

Unless otherwise defined, all terms used herein have the same meanings as commonly understood by one of ordinary skill in the art to which this invention belongs. It will be further understood that terms such as those defined in commonly used dictionaries should be interpreted as having meanings that are consistent with their meanings in the context of the relevant art and will not be interpreted in an idealized or overly formal sense unless expressly so defined herein.

Hereinafter, a video processing device and method according to embodiments will be described in detail with reference to FIGS. 1 through 8.

FIG. 1 is a block diagram of a structure of a video processing device 100 generating a secured video, according to an embodiment. Referring to FIG. 1, the video processing device 100 may include a loader 110, an encoder 120, a security information inserter 130, and an output unit 140.

The loader 110 may load an original video. The original video may include original video data in an un-encoded state.

The encoder 120 may encode the loaded original video. The encoder 120 may encode the original video by using a codec. The encoded video may include a header and a payload. The payload may include a result obtained by encoding the original video. The header may include information about the encoded video, information about the payload, or information about the result obtained by encoding the original video.

The security information inserter 130 may generate a secured video by inserting security information into the encoded video. The security information may include information about a right to reproduce the secured video. For example, the security information may include identification (ID) of a video reproducing device having a right to reproduce the secured video. The security information may include ID of a user having a right to reproduce the secured video.

The security information may further include a maximum number of times of reproducing the secured video or a reproducible period of the secured video. The security information may further include a point of time when the secured video is generated or ID of the video processing device 100 that generated the secured video.

There may be at least one video reproducing device having a right to reproduce the secured video. Accordingly, when there is a plurality of video reproducing devices having a right to reproduce the secured video, the security information may include a list of IDs of the video reproducing devices. Also, the video reproducing devices may have different reproduction rights. Accordingly, the security information may include information about reproduction rights respectively corresponding to the video reproducing devices.

Also, the reproduction right of the video reproducing device may include information about content allowed to be reproduced or information about content restricted from being reproduced from among content included in the secured video. Accordingly, the security information may include an ID of a video reproducing device, information about content allowed to be reproduced by the video reproducing device, or information about content restricted from being reproduced by the video reproducing device.

For example, it is assumed that a screen included in the secured video includes a human portion and a background portion. A first video reproducing device may be restricted from reproducing both the human portion and the background portion from among the content included in the secured video. Also, a second video reproducing device may be restricted from reproducing the human portion and allowed to reproduce the background portion. Also, a third video reproducing device may be allowed to reproduce the human portion and restricted from reproducing the background portion. Also, a fourth video reproducing device may be allowed to reproduce both the human portion and the background portion. The security information may include information about a portion allowed to be or restricted from being reproduced by each of the video reproducing devices.

The security information inserter 130 may insert the security information into the header of the encoded video. According to another embodiment, the security information inserter 130 may insert the security information into the payload of the encoded video. According to another embodiment, the security information inserter 130 may insert the security information into the original video before being encoded.

The original video may include many pixels. Thus, a viewer may not notice even when the original video data corresponding to some of the pixels is changed to another data. Before the encoder 120 encodes the original video, the security information inserter 130 may overwrite the security information on a portion where the original video data corresponding to the some pixels included in the original video is recorded. In other words, the security information inserter 130 may overwrite the security information on pixel data corresponding to the some pixels included in the original video. The encoder 120 may encode the original video into which the security information is inserted.

As such, when the security information is inserted into the head, the payload, or the original video, it may be difficult for a hacker or a cracker to hack the security information. Accordingly, security of the content included in the video may be enhanced.

Figure 2:
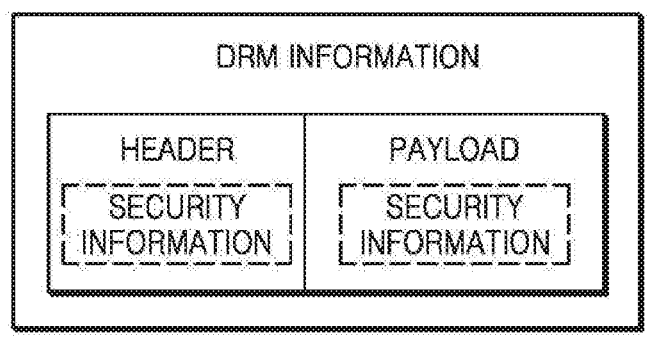
FIG. 2 is a structural diagram showing a structure of a secured video into which security information is inserted and digital rights management (DRM) is applied.

The security information inserter 130 may additionally apply digital rights management (DRM) to the video into which the security information is inserted. In other words, the security information inserter 130 may further insert DRM information into the video into which the security information is inserted. According to another embodiment, the security information inserter 130 may not apply additional DRM to the video into which the security information is inserted. In other words, the secured video may be a result obtained by applying DRM to the video into which the security information is inserted, or may be a video to which additional DRM is not applied and into which the security information is inserted. FIG. 2 is a structural diagram showing a structure of a secured video into which security information is inserted and DRM is applied.

The output unit 140 may transmit the secured video generated as such to an external destination.

Figure 3:
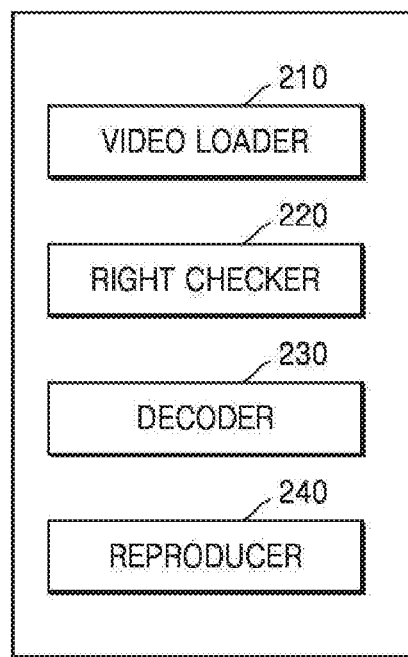
FIG. 3 is a block diagram of a structure of a video processing device decoding a secured video, according to an embodiment.

FIG. 3 is a block diagram of a structure of a video processing device 200 decoding a secured video, according to an embodiment. Referring to FIG. 3, the video processing device 200 may include a video loader 210, a right checker 220, a decoder 230, and a reproducer 240.

The video loader 210 may load a secured video.

The right checker 220 may detect information about content allowed to be or restricted from being reproduced by the video processing device 200, from among content included in the secured video by using security information included in the secured video. When DRM is applied to the secured video, the right checker 220 may access the security information by using a license corresponding to the DRM. In other words, when the secured video further includes DRM information, the right checker 220 may access the security information by using a license corresponding to the DRM information. Also, the right checker 220 may further detect whether a maximum number of times of reproducing the secured video is already reached or a reproducible period of the secured video is already passed by using the security information.

The decoder 230 may decode the secured video by using the detected information. The decoder 230 may decode at least a portion of the content included in the secured video to be not normally reproduced according to the information about the content allowed to be or restricted from being reproduced by the video processing device 200. For example, the decoder 230 may perform scrambling on a portion restricted from being reproduced from among the content included in the video. According to another embodiment, the decoder 230 may decode the portion restricted from being reproduced from among the content included in the video, by using an entropy codec. According to another embodiment, the decoder 230 may insert a watermark into the portion restricted from being reproduced from among the content included in the video.

A certain screen included in the secured video may include both content allowed to be reproduced and content restricted from being reproduced. In this case, the decoder 230 may perform scrambling on or insert watermark into a portion where the content restricted from being reproduced is located in the certain screen.

Figure 4:
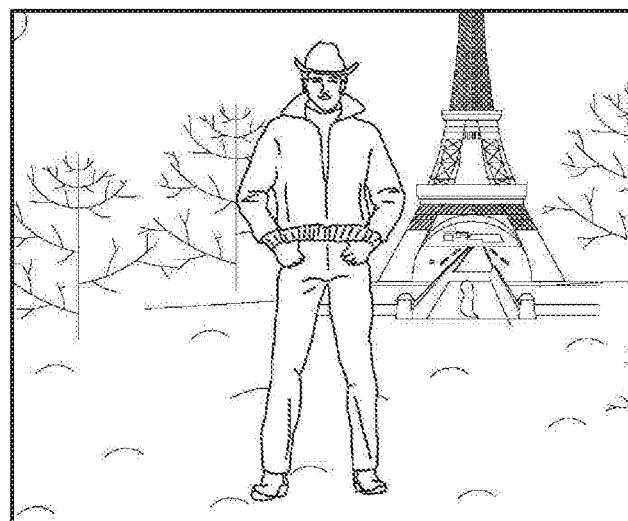
FIG. 4 illustrates one scene included in an original video.
Figure 5:
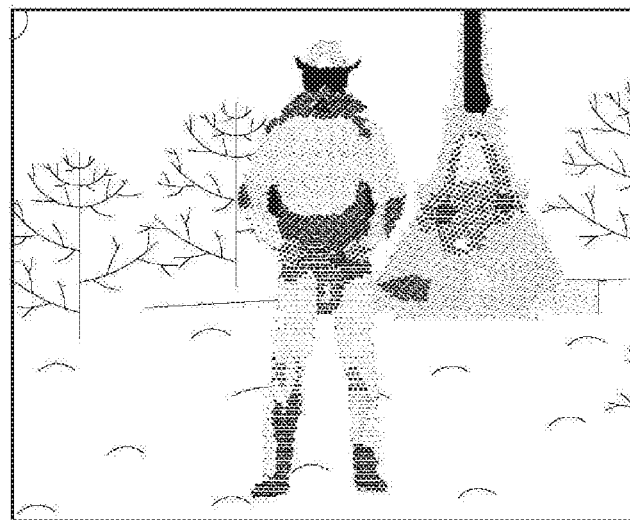
FIG. 5 illustrates a result of decoding a portion corresponding to the scene of FIG. 4 by using a video processing device having a first right with respect to reproducing of a secured video.
Figure 6:
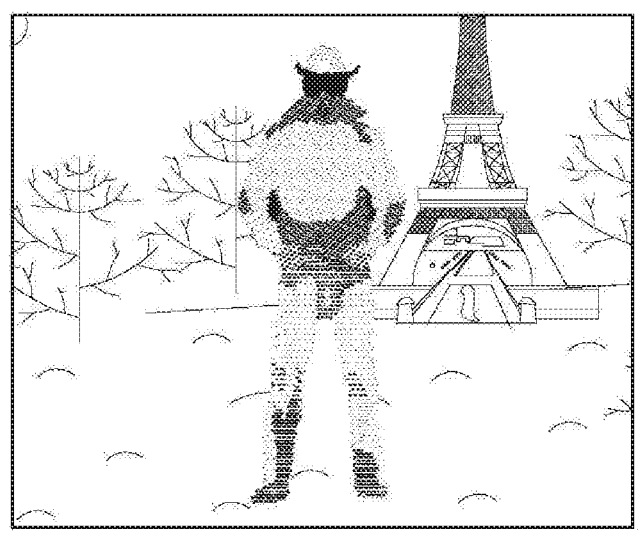
FIG. 6 illustrates a result of decoding a portion corresponding to the scene of FIG. 4 by using a video processing device having a second right with respect to reproducing of a secured video.

FIG. 4 illustrates one scene included in an original video. For example, when all content included in a secured video is allowed to be reproduced, a decoding result of the decoder 230 may be the same as the screen of FIG. 4. Also, when a human portion and an artifact portion are restricted from being reproduced from among the content included in the secured video, a decoding result of the decoder 230 may be the same as a scene of FIG. 5. Also, when a human portion is restricted from being reproduced and an artifact portion is allowed to be reproduced from among the content included in the secured video, a decoding result of the decoder 230 may be the same as a screen of FIG. 6.

The reproducer 240 may reproduce the video decoded as such.

Figure 7:
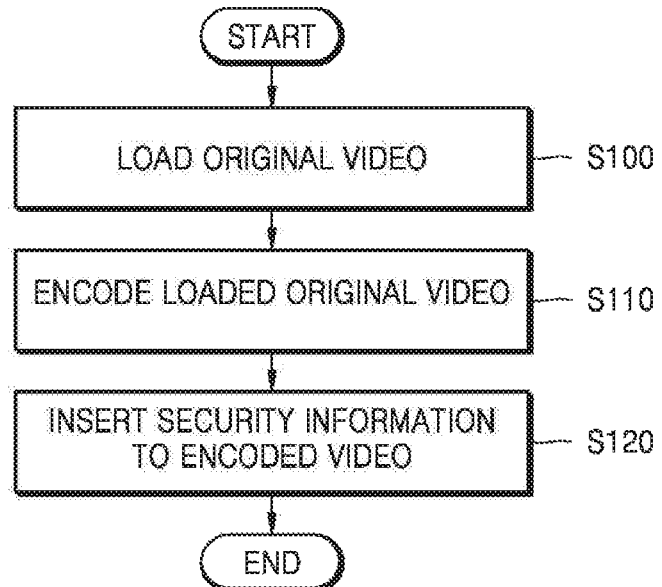
FIG. 7 is a flowchart of processes of performing a video processing method for generating a secured video, according to an embodiment.

FIG. 7 is a flowchart of processes of performing a video processing method for generating a secured video, according to an embodiment. Referring to FIG. 7, first, an original video may be loaded in operation S100. The loader 110 may load the original video.

Then, the loaded original video may be encoded in operation S110. The encoder 120 may encode the loaded original video, thereby generating an encoded video including a header and a payload.

Then, security information may be inserted into the encoded video in operation S120. The security information inserter 130 may generate a secured video by inserting the security information into the encoded video.

Figure 8:
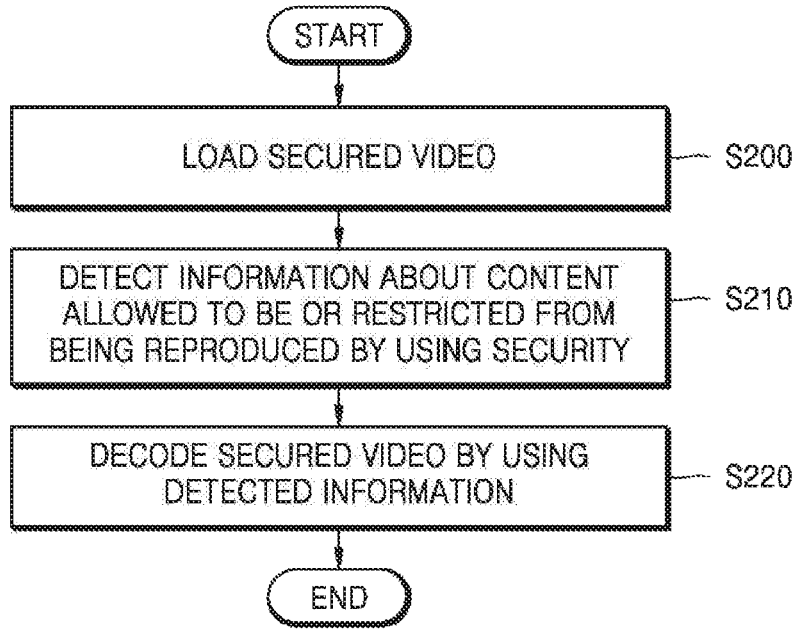
FIG. 8 is a flowchart of processes of performing a video processing method for decoding a secured video, according to an embodiment.

FIG. 8 is a flowchart of processes of performing a video processing method for decoding a secured video, according to an embodiment.

FIG. 8 is a flowchart of processes of performing a video processing method for decoding a secured video, according to an embodiment. Referring to FIG. 8, first, a secured video may be loaded in operation S200. The video loader 210 may load the secured video.

Then, information about content allowed to be or restricted from being reproduced from among content included in the secured video may be detected in operation S210 by using security information included in the loaded secured video. The right checker 220 may detect the information about the content allowed to be or restricted from being reproduced by using the security information.

Then, the secured video may be decoded by using the detected information, in operation S220. The decoder 230 may decode some of the content included in the secured video to be not normally reproduced according to the information about the content allowed to be or restricted from being reproduced.

According to one or more embodiments described above, security of content included in a video may be enhanced. Also, at least a portion of content included in a video may be restricted from being reproduced according to a level of right set in a video reproducing device reproducing the video.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the embodiments described above are not limiting the scope of the invention.

The invention claimed is:

1. A video processing device comprising:
a loader configured to load an original video;
an encoder configured to generate an encoded video including a header and a payload by encoding the loaded original video;
a security information inserter configured to insert security information about the encoded video into the header, wherein the security information comprising first information indicating that a reproduction device is allowed to reproduce a first portion of a frame of the encoded video and second information indicating that the reproduction device is restricted from reproducing a second portion of the frame of the encoded video, the first information and the second information being separate from each other; and
output unit configured to transmit the encoded video, into which the security information is inserted, to the reproduction device,
wherein the second portion of the frame is restricted from reproduction by scrambling or watermarking performed by the reproduction device based on the security information.

2. The video processing device of claim 1, wherein the security information comprises an identifier of a video reproducing device having a right to reproduce the encoded video.

3. The video processing device of claim 2, wherein the security information further comprises information about content allowed to be reproduced by the video reproducing device or information about content restricted from being reproduced by the video reproducing device, from among content included in the encoded video.

4. The video processing device of claim 3, wherein the security information inserter further inserts digital rights management (DRM) information into the encoded video into which the security information is inserted.

5. The video processing device of claim 1, wherein the security information allows the first portion of the frame of the encoded video for reproduction and restricts the second portion of the frame of the encoded video from reproduction, at a first video reproducing device, and
wherein the security information allows the first portion and the second portion of the frame of the encoded video for reproduction, at a second video reproducing device.

6. A video processing device comprising:
a video loader configured to load a secured video generated by inserting, into a header of an encoded video, security information about the encoded video, wherein the security information comprising first information indicating that a first portion of a frame of the secured video is allowed for reproduction and second information indicating that a second portion of the frame of the secured video is restricted from reproduction, wherein the first information and the second information being separate from each other;
a right checker configured to allow reproduction of the first portion of the frame of the secured video for reproduction and restrict the second portion of the frame of the secured video from reproduction, from among content included in the secured video, by using the security information; and
a decoder configured to decode the secured video, by using the security information, to reproduce the first portion of the frame of the encoded video and to perform scrambling or watermarking on the second portion of the frame of the encoded video to restrict from reproduction.

7. The video processing device of claim 6, wherein the decoder performs scrambling on the second portion of the frame of the secured video.

8. The video processing device of claim 7, wherein the decoder performs scrambling only on the second portion of the frame that is restricted from being reproduced and does not perform scrambling on the first portion of the frame.

9. The video processing device of claim 6, wherein the decoder inserts a watermark into the second portion of the frame of the secured video.

10. The video processing device of claim 6, wherein the secured video further comprises digital rights management (DRM) information, and the right checker accesses the security information by using a license corresponding to the DRM information.

11. The video processing device of claim 6, further comprising a reproducer configured to reproduce the decoded secured video.

12. The video processing device of claim 6, wherein the security information allows the first portion of the frame of the encoded video for reproduction and restricts the second portion of the frame of the encoded video from reproduction, at a first video reproducing device, and
  wherein the reproduction right allows the first portion and the second portion of the frame of the encoded video for reproduction, at a second video reproducing device.

13. A video processing method comprising:
  loading an original video;
  generating an encoded video comprising a header and a payload by encoding the loaded original video;
  inserting security information about the encoded video into the header, the security information comprising first information indicating that a reproduction device is allowed to reproduce a first portion of a frame of the encoded video and second information indicating that the reproduction device is restricted from reproducing a second portion of the frame of the encoded video, the first information and the second information being separate from each other; and
  transmitting the encoded video, into which the security information is inserted, to the reproduction device,
  wherein the second portion of the frame is restricted from reproduction by scrambling or watermarking performed by the reproduction device based on the security information.

14. The video processing method of claim 13, wherein the security information allows the first portion of the frame of the encoded video for reproduction and restricts the second portion of the frame of the encoded video from reproduction, at a first video reproducing device, and
  wherein the reproduction right allows the first portion and the second portion of the frame of the encoded video for reproduction, at a second video reproducing device.

15. A non-transitory computer-readable recording medium having recorded thereon a program, which when executed by a computer, performs the video processing method of claim 13.

* * * * *